Nov. 12, 1963 — F. E. BENJAMIN ETAL — 3,110,445
COMBINATION AERATOR AND HOSE COUPLING DEVICE
Filed Dec. 10, 1962
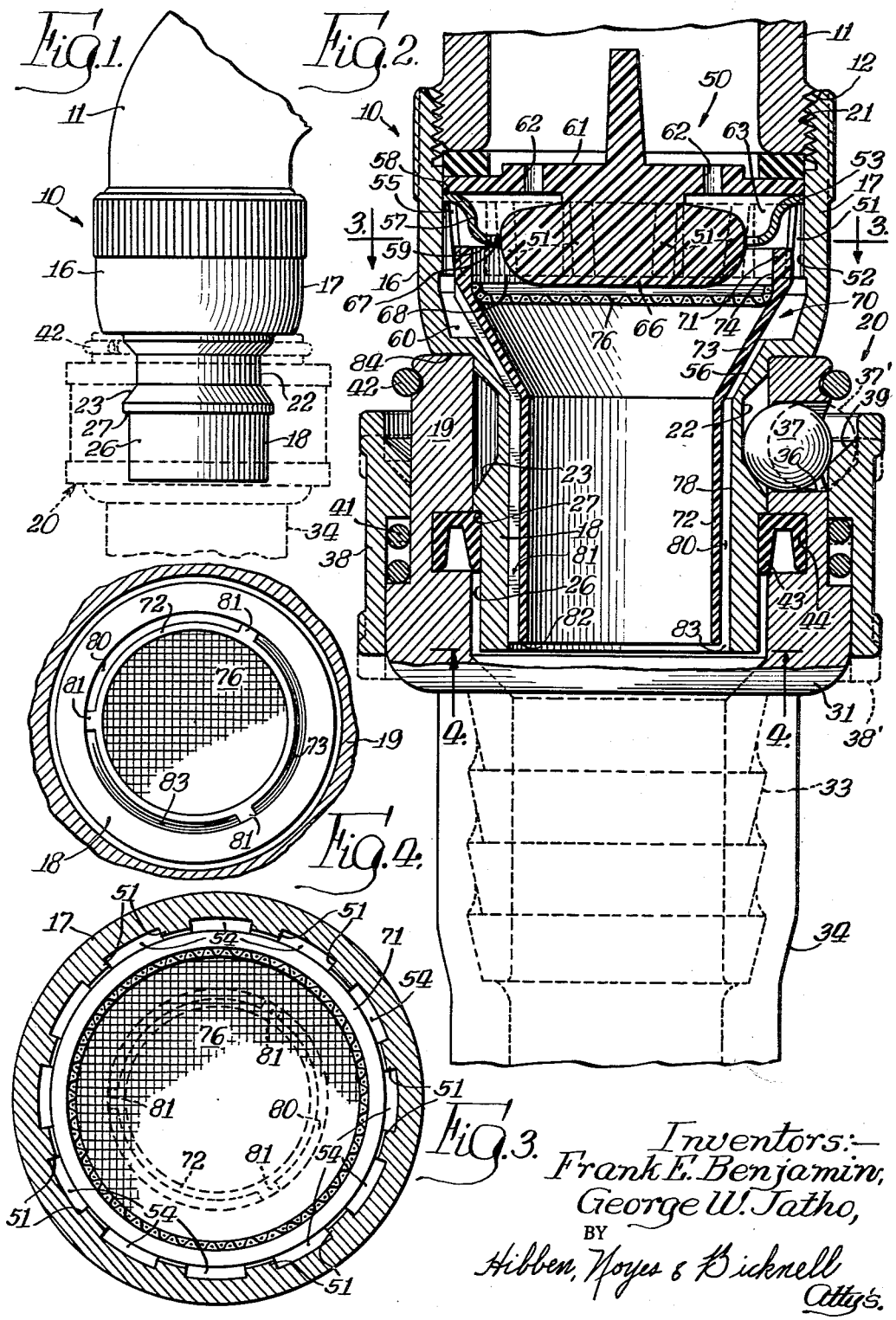
Inventors:—
Frank E. Benjamin,
George W. Tatho,
BY
Hibben, Noyes & Bicknell
Attys.

United States Patent Office 3,110,445
Patented Nov. 12, 1963

3,110,445
COMBINATION AERATOR AND HOSE
COUPLING DEVICE
Frank E. Benjamin, Chicago Heights, and George W.
Jatho, Chicago, Ill., assignors to Wrightway Engineering Co., Chicago, Ill., a corporation of Illinois
Filed Dec. 10, 1962, Ser. No. 243,491
7 Claims. (Cl. 239—432)

This invention relates to aerators, and more particularly to a combination aerator and hose coupling device.

The popularity of aerators for mixing air and water to provide a soft, bubbly, non-splashing stream has led to such general use of these devices that they are now regarded as a standard plumbing item. Moreover, because of such popularity, many specialized types of aerators have been developed for use in specific applications and for particular purposes.

One of these specialized types is the so-called combination aerator and hose coupling which functions as an aerator when the device is used by itself and as a hose coupling for connecting the water supply hoses of various types of appliances, such as portable dishwashing machines and the like, to a water faucet on which the device is mounted. The aerator portion of such a combination device usually employs radial or lateral air inlet ports in the side wall of the aerator housing which supply air to the mixing structure of the aerator. To prevent back-flow through these ports, the device usually includes sealing structure for closing the ports when the fitting is engaged with the device.

In accordance with the present invention, the necessity for such sealing structure is completely eliminated by utilizing an aerator of the type having a bottom air inlet and without the usual lateral air ports in the aerator casing. However, considerable difficulty was encountered in adapting this type of aerator for use in a combination aerator and hose coupling device. Among the many problems to be overcome in such an adaptation was that of preventing back-flooding through the air inlet passages due to the reduced size and specific shape of the male coupling portion of the device in which the aerator portion is mounted.

Accordingly, it is a general object of the present invention to provide a novel and improved combination aerator and hose coupling device for connection to a water faucet, or the like, wherein the aerator portion of the device employs a bottom air inlet.

Another object of the invention is to provide a novel and improved combination aerator and hose coupling device which effectively prevents back-flooding through the bottom air inlet when the device is functioning solely as an aerator.

A more particular object is to provide a novel and improved combination aerator and hose coupling device of the foregoing character which eliminates the need for sealing the air inlet when the device is functioning as a hose coupling.

A further object is to provide a novel combination aerator and hose coupling device which is simple in construction, reliable in operation, and economical to manufacture.

Other objects and advantages will become apparent from the following detailed description and accompanying drawing, in which:

FIG. 1 is a side elevational view of a water faucet having a combination aerator and hose coupling device embodying the features of the present invention mounted on the outlet end of the faucet and showing in dotted line a typical snap-coupling type hose fitting engaged with the device;

FIG. 2 is an enlarged longitudinal sectional view showing internal structural details of the combination device illustrated in FIG. 1 and the associated snap-coupling fitting;

FIG. 3 is a horizontal sectional view taken along the line 3—3 of FIG. 2; and

FIG. 4 is a fragmentary horizontal sectional view along the line 4—4 of FIG. 2.

In FIGS. 1 and 2, a combination aerator and hose coupling device 10 embodying the features of the present invention is shown mounted on the end of a faucet 11, which is externally threaded as at 12 to facilitate mounting of the device 10.

The device 10, in the present instance, comprises an imperforate tubular casing 16 having an upper or aerator enclosing portion 17 and a lower or male coupling portion 18 which is adapted to receive and releasably retain the female portion, indicated at 19, of an associated snap-coupling fitting 20. The upper end of the casing portion 17 which comprises a liquid inlet is internally threaded, as at 21, to permit threaded engagement and disengagement of the device 10 relative to the faucet 11.

The lower casing or male coupling portion 18 is shaped to conform to the standardized specifications for this type of fitting and consequently is of smaller diameter than the casing portion 17. The lower casing or male coupling portion 18 also includes an annular groove 22 therearound having a tapered lower side wall 23, and the bottom half of the casing portion 18 includes a reduced diameter portion 26 defining an annular shoulder 27 spaced somewhat below the groove 22.

Before proceeding with the detailed description of the device 10, a brief description of the snap-coupling fitting 20 will be given, the latter being constructed in accordance with standardized specifications so as to readily mate with the male coupling portion 18. Thus, the fitting 20 comprises an elongated tubular member 31 which includes an upper or female coupling portion 19 adapted to engage the male coupling portion 18 of the device 10, and an integral nipple 33 adapted to receive and retain the end of a hose 34. The upper end of the portion 19 is provided with a plurality of, and in this instance three, circumferentially spaced radially extending openings or bores 36, only one of which is shown in FIG. 2. A ball 37 having a diameter somewhat greater than the wall thickness of the portion 19 is mounted in each bore, the balls 37 being adapted to be shifted radially inwardly in their bores 36 to seat in the annular groove 22 of the male coupling portion 18 and against the tapered lower edge 23 of the groove, as illustrated by the full line position of the ball 37 in FIG. 2.

The balls 37 are releasably urged into engagement with the groove 22 to maintain the coupling portions 18 and 19 engaged by means of an axially shiftable sleeve member 38 disposed around the coupling portion 19. The sleeve 38 is provided at its upper end with an annular tapered internal shoulder 39 for engaging the balls 37 when the sleeve is shifted upwardly or toward the outer end of the coupling portion 19. A coil spring 41 is provided concentrically between coacting portions of the sleeve 38 and the coupling portion 19 to normally urge the sleeve 38 upwardly toward its full line position illustrated in FIG. 2, and a snap ring 42 is provided around the upper end of the coupling portion 19 to prevent disengagement of the sleeve 38 when the fitting 20 is removed from the device 10. An annular rubber seal 43 seats in an annular groove 44 in the inner wall of the coupling portion 19 and extends into the reduced diameter portion 26 of the coupling portion 18 to prevent fluid leakage between the coupling portions 18 and 19 when the fitting 20 is engaged with the device 10.

Disengagement of the fitting 20 from the device 10 is effected by axially retracting or shifting the sleeve 38 to the dotted line position indicated at 38' in FIG. 2. Such movements permits the balls 37 to move outwardly in their bores 36, as indicated by the dotted line position 37' of the ball in FIG. 2.

Mounted within the aerator portion 17 of the casing 16 is aerating means, indicated generally at 50, for aerating inlet liquid, in this instance, water flowing through the faucet 11 and device 10. Means in the form of a plurality of circumferentially spaced vertically extending ribs or splines 51 (FIGS. 2 and 3) are provided around the inner wall, indicated at 52, of the casing portion 17, and the ribs 51 define a series of shoulders 53 at their upper ends upon which the internal structure of the aerating means 50 is mounted. A plurality of circumferentially spaced axially extending grooves 54 are defined between the ribs 51, and the inner radial edge, indicated at 55, of each rib 51 tapers downwardly and inwardly toward the lower end of the casing portion 17. An enlarged space 60 is provided in the casing portion 17 below the ribs 51, and the lower end of the casing portion 17 has an inner tapered wall 56 adjacent the coupling portion 18 of the casing.

Mounted on the shoulders 53 is an annular baffle 57 having its upper end 58 flared outwardly into tight frictional engagement with the inner wall 52 of the casing portion 17. The major portion of the baffle 24 extends axially downwardly to define a skirt, the lower end of which, indicated at 59, is inturned radially to provide a lip.

A disk 61 having a diameter somewhat less than the diameter of the inner wall 52 is mounted above the baffle 57, the disk 61 being removably seated on the outwardly flared upper end 58 of the baffle 57. The disk 61 includes a plurality of axially extending bores or openings 62 therethrough arranged in a ring having a diameter somewhat less than the inner diameter of the inturned lip 59. The openings or apertures 62 convert the stream of water in the faucet 11 into a multiplicity of substantially independent discrete jets which discharge into a mixing chamber 63 below the disk 61. The jets in chamber 63 are surrounded by air, as will be hereinafter described, and a certain amount of this air is entrained in the water.

Depending from the disc 61 is a generally mushroom-shaped breakup or splash plug 66 having a diameter somewhat greater than the diameter of the ring of openings 62 and less than that of the inturned lip 59 of the baffle 57. Thus, the adjacent edge of the lip 59 and the maximum diameter portion of the plug 66 define an annular passage or orifice 67 therebetween.

The jets of water from the openings 62 impinging upon the plug 66 are broken up and mixed with air in the chamber 63 and after passing downwardly through the annular orifice 67 enter an additional mixing zone 68 below the baffle 57. Further mixing of the air and water is achieved in the zone 68 with the result that a soft aerated mixture is obtained.

Mounted below the aerating means 50 and cooperable therewith is a tubular partition 70, preferably of organic plastic material such as polyethylene or Delrin. The tubular portion 70 comprises an upper cylindrical portion 71 disposed in the casing portion 17, a lower cylindrical portion 72 of lesser diameter than the portion 71 and disposed within the coupling portion 18, and an intermediate tapered portion 73 connecting the upper and lower portions 71 and 72, respectively.

The upper portion 71 engages the ribs 51 near the lower ends of the inner radial edges 55 thereof to thereby center the portion 71 in the casing portion 17. The annular inner surface, indicated at 74, of the portion 71 cooperates with the periphery of the breakup plug 66 to define the mixing zone 68.

The intermediate portion 73 of the partition 70 has an angle of taper substantially equal to that of the tapered wall 56 (FIG. 2) at the lower end of the casing portion 17, such angle preferably being about 60 degrees. A screen 76 is mounted at the upper end of the tapered portion 73, the screen 76 serving to form and coalesce the aerated mixture from the zone 68 so as to provide a coherent aerated stream when the device 10 is functioning as an aerator.

The lower cylindrical portion 72 has an outer diameter somewhat less than the inner diameter of the side wall, indicated at 78, of the coupling portion 18 to define an annular space 80 therebetween for the upward passage of air from the lower end of the coupling portion. In order to assure centering of the lower portion 72 in the bore or sidewall 78 of the coupling portion 18, a plurality, and preferably three, circumferentially spaced axially extending ribs or splines 81 (FIGS. 2, 3 and 4) are provided on the outer surface of the lower portion 72 and the intermediate portion 73, the ribs 81 engaging the adjacent side wall 78 and the tapered inner wall 56 of the casing portion 17. The upper ends of the ribs 81 terminate at the periphery of the upper portion 71. The lower portion 72 has a length substantially equal to but somewhat less than the axial length of the inner side wall 78 of the coupling portion 18, and the lower end, indicated at 82, of the portion 72 defines a fluid outlet for aerated fluid flowing downwardly through the partition 70. The lower end, indicated at 83 (FIGS. 2 and 4), of the annular passage 80 comprises an inlet for air, the passage 80 communicating at its upper end with the aerating means 50 by means of the space 60 and the grooves 54.

The extended length of the tapered portion 73 and lower portion 72 assures effective operation of the aerating means 50 and prevents back-flooding through the air passages due to the restricting effect of the portion 72 by permitting a gradual increase in the velocity of the aerated flow. In addition, the extended length of the portion 72 improves the coalescence or forming of the aerated stream.

In the operation of the combination aerator and hose coupling device 10, when the snap-coupling fitting 20 is disengaged from the coupling portion 18, the device 10 functions as a bottom air inlet aerator. That is, water under pressure from the faucet 11 is converted into a multiplicity of fine or discrete jets of water after passage through the ring of openings 62 in the disk 61. These jets are surrounded by air which flows upwardly from the air inlet 83 at the lower end of the casing portion 18, through the annular air passage 80 between the splines 81, and thence through the space 60 and the grooves 54 into the mixing zone 68 and also through the orifice 67 into the mixing chamber 63. The jets of water from the openings 62 impinging upon the upper surface of the plug 66 are broken up and become intimately mixed with air in the mixing zone 63.

The intimate mixture of air and water in the chamber 63 flows downwardly through the orifice 67 to the mixing zone 68 where further mixing of air and water takes place. Thereafter, the aerated stream passes downwardly through the screen 76 which softens the flow and contributes to its non-splash characteristics.

As heretofore mentioned briefly, the provision of a bottom air inlet for the aerator device eliminates the customary lateral air ports in the casing portion 17, thereby avoiding the necessity for a special seal arrangement to close such ports when the coupling 20 is connected to the aerator. However, it will be appreciated that the aerator body or casing 16 is specially designed to provide the male half of the snap-coupling connection. Thus, the upper casing portion 17 comprises the customary aerator housing but the lower casing portion 18 comprises an appendage providing the necessary snap-coupling structure for coaction with the female coupling unit 20. Since the dimensions of the elongated lower casing portion 18 must correspond to the standard snap-coupling body, it will be seen from FIG. 2 that the provision of the casing portion 18 results in an elongated outlet from the aerator having a substantially restricted diameter as compared with the normal aerator casing outlet. Moreover, since the tubular partition 70 must fit within the lower casing portion 18, the diameter of the effluent aerated stream is restricted appreciably as compared with a conventional bottom air inlet aerator.

Accordingly, it will be recognized that the inclusion of the lower casing portion 18 in the combination device imparts a materially increased resistance to fluid flow at the outlet end of the device. Unless special design precautions are taken, this increased resistance to flow at the outlet tends to cause back-flooding of water through the air passages which would render the device inoperative as an aerator. In accordance with the present invention, this tendency toward back-flooding is overcome by the provision in the tubular partition 70 of the elongated tapered section 73 having a substantial axial extent such that the aerated stream discharging from the screen 76 is gradually restricted in diameter to provide streamlined flow and a substantially increased velocity sufficient to overcome the added flow resistance of the restricted diameter tubular portion 72. In addition to imparting increased velocity under streamline flow conditions so as to prevent back-flooding, the tapered section 73 is also of sufficient length to cause coalescence and forming of the high velocity effluent fluid into a coherent aerated stream.

The integral splines or ribs 81 on the lower section 72 of the tubular partition 70 insure positioning of the section 72 in centered or concentric relation within the casing portion 18, thereby preventing deflection of the section 72 and insuring a uniform symmetrical air passage 80. If the tubular partition 70 is not accurately centered in the body 16, unequal air distribution could result with consequent inefficient operation of the aerating means 50. The extension of the splines or ribs 81 upwardly along the tapered portion 73 of the tubular partition is also important to insure uniform spacing of the tapered section 73 from the tapered wall portion 56 of the body of the device so that uniform distribution of inlet air is obtained throughout the length of the device from the lower inlet end 83 of the passage 80 to the terminus of the cylindrical portion 71 at the upper end of the partition 70. Thus, with the external splined structure of the partition 70 it is impossible to block off or restrict any portion of the air inlet channel by improper assembly of the device. The partition 70 is merely inserted into the casing or body 16 and pressed into position until the splines 81 on the tapered section 73 engage the tapered casing surface 56.

When it is desired to use the device 10 as a hose coupling, it is only necesary to engage the female coupling portion 19 of the fitting 20 around the lower or male portion 18 of the casing in the manner illustrated in FIG. 2. Such engagement is effected in a well known manner by initially retracting the sleeve 38 to permit the retaining balls 37 of the fitting to move outwardly in their bores 36 until the portion 19 is fully engaged with the portion 18. A shoulder 84 is formed on the under surface of the casing portion 17 to limit coupling movement of the fitting 20 and to align the balls 37 with the groove 22.

When the coupling portion 19 is fully engaged with the coupling portion 18, the sleeve 38 may be released to seat the balls 37 in the groove 22 to lock the coupling to the device 10. When so connected, the annular seal 43 prevents escape of water between the casing portion 18 and the coupling portion 19.

It will be understood that when the hose coupling 20 is connected to the coupling portion 18 of the casing 16, the device no longer functions as an aerator since the air inlet 83 is enclosed within the liquid flow passage to the hose 34 and air has no access to the device. However, the annular air passage 80 and its inlet end 83 remain unobstructed, and as a result of back pressure in the hose 34, pressure is substantially equalized throughout the device 10 so that liquid flows both through the center of the tubular partition 70 and also through the annular passage 80 into the nipple 33 and the hose 34.

Although the invention has been described with reference to one specific structural embodiment, it will be understood that modifications and equivalent structures may be resorted to without departing from the scope of the invention as defined in the appended claims.

We claim:

1. A combination aerator and hose coupling device adapted to be connected to a faucet or the like, comprising an imperforate tubular casing including an upper aerator portion having a liquid inlet at its upper end adapted to be connected to said faucet and a lower coupling portion having means for receiving and releasably retaining a hose fitting, said aerator portion having aerating means therein for breaking up inlet liquid into a multiplicity of streams and intimately mixing the same with air, and a tubular partition mounted concentrically in said casing and defining a fluid outlet at the lower end of said coupling portion for discharging aerated fluid therefrom, said tubular partition and casing defining an annular passage therebetween for the entry of air into the casing from the lower end thereof in countercurrent relation with respect to the flow of aerated fluid from said tubular partition when the hose fitting is unattached to said coupling portion, and said passage remaining open and unobstructed when the hose fitting is connected to said coupling portion so that liquid is discharged through said partition and through said passage.

2. A combination aerator and hose coupling device adapted to be connected to a faucet or the like, comprising an imperforate tubular casing including an upper aerator portion having a liquid inlet at its upper end adapted to be connected to said faucet and a lower coupling portion of smaller diameter than said aerator portion and having means for receiving and releasably retaining a hose fitting, said aerator portion having aerating means therein for breaking up inlet liquid into a multiplicity of streams and intimately mixing the same with air, and a tubular partition mounted concentrically in said casing and defining a fluid outlet at the lower end of said coupling portion for discharging aerated fluid therefrom, said tubular partition including an upper portion disposed in the aerator portion of said casing, a lower portion disposed in the coupling portion of said casing, and a tapered portion connecting the upper and lower portions of said partition, said tubular partition and casing defining an annular passage therebetween for the entry of air into the casing from the lower end thereof in countercurrent relation with respect to the flow of aerated fluid from said tubular partition when the hose fitting is unattached to said coupling portion, and said passage remaining open and unobstructed when the hose fitting is connected to said coupling portion so that liquid is discharged through said partition and through said passage.

3. The combination of claim 2, further characterized in that the lower portion of said tubular partition has a plurality of longitudinally extending ribs on its outer surface for engaging the inner surface of said casing to center said partition.

4. The combination of claim 2, further characterized in that a plurality of circumferentially spaced ribs are provided on said partition, and said ribs extend upwardly along the outer surface of the lower and tapered portions of said tubular partition.

5. The combination of claim 2, further characterized in that the lower portion of said tubular partition has a length substantially equal to that of said hose coupling portion.

6. The combination of claim 5, further characterized in that the tapered portion of said partition is disposed below said aerating means, and has an angle of taper of about 60 degrees.

7. A combination aerator and hose coupling device adapted to be connected to a faucet or the like to provide an unaerated liquid flow when an associated hose fitting is engaged therewith and an aerated liquid flow when said fitting is disengaged; comprising an imperforate tubular casing having an upper aerator portion adapted to be connected to said faucet and a lower hose coupling portion of lesser diameter than said aerator portion and adapted to receive an associated hose fitting, the inner walls of said aerator and hose coupling portions of said casing being substantially cylindrical and said casing also having a tapered section connecting said inner walls, said aerator portion having a liquid inlet at its upper end; aerating means disposed within said aerator portion for intimately mixing inlet liquid with air; a tubular partition mounted concentrically in said casing and including an upper cylindrical portion disposed in the aerator portion of said casing, a lower cylindrical portion disposed in said hose coupling portion of said casing and defining a fluid outlet at the lower end thereof for discharging aerated fluid, and a tapered portion connecting the upper and lower portions of said partition; said tubular partition and said casing defining an annular air passage therebetween for communicating air to said aerating means, the tapered portion of said partition having an angle of taper substantially equal to that of said tapered section of said casing; and a plurality of longitudinally extending circumferentially spaced ribs on the outer surface of the lower and tapered portions of said tubular partition, said ribs engaging the inner walls of said hose coupling portion and said tapered section of said casing and centering said partition therein.

References Cited in the file of this patent
UNITED STATES PATENTS

| | | |
|---|---|---|
| 2,954,936 | Shames et al. | Oct. 4, 1960 |
| 3,010,659 | Goodrie | Nov. 28, 1961 |
| 3,011,725 | Shames et al. | Dec. 5, 1961 |